United States Patent
Radobenko

[15] 3,695,501
[45] Oct. 3, 1972

[54] DIE BONDER APPARATUS
[72] Inventor: William Radobenko, Scottsdale, Ariz.
[73] Assignee: Automated Equipment Corp., Phoenix, Ariz.
[22] Filed: May 21, 1970
[21] Appl. No.: 39,403

[52] U.S. Cl. ...................228/3, 29/203 P, 29/626, 219/78, 228/44
[51] Int. Cl. ...........................................B23k 21/00
[58] Field of Search......29/155.5, 626, 203 V, 203 P; 219/78; 228/161, 3, 8, 9, 44

[56] References Cited
UNITED STATES PATENTS

| | | | |
|---|---|---|---|
| 3,165,818 | 1/1965 | Soffa et al. | 29/155.5 |
| 3,271,555 | 9/1966 | Hirshon et al. | 219/85 |
| 3,442,432 | 5/1969 | Santangini | 228/44 |
| 3,448,911 | 6/1969 | Cushman | 228/44 |
| 3,563,443 | 3/1969 | Pedrotti | 228/1 |

Primary Examiner—John F. Campbell
Assistant Examiner—R. J. Craig
Attorney—Harry E. Aine and William J. Nolan

[57] ABSTRACT

A high speed, reliable die bonder is provided for picking up dice from a loading position and transporting them to a bonding position and for thermocompression bonding the dice to a transistor strip. A low-inertia, straight-line reciprocating ram mechanism operated by a modified sine-curve, motor-driven cam serves as the transport mechanism. Apparatus driven from the cam lifts and lowers the die pick-up mechanism, which is mounted on the ram mechanism. The transistor strip is indexed with the ram mechanism to synchronize the transistor strip with the die pick-up and die bonding.

34 Claims, 11 Drawing Figures

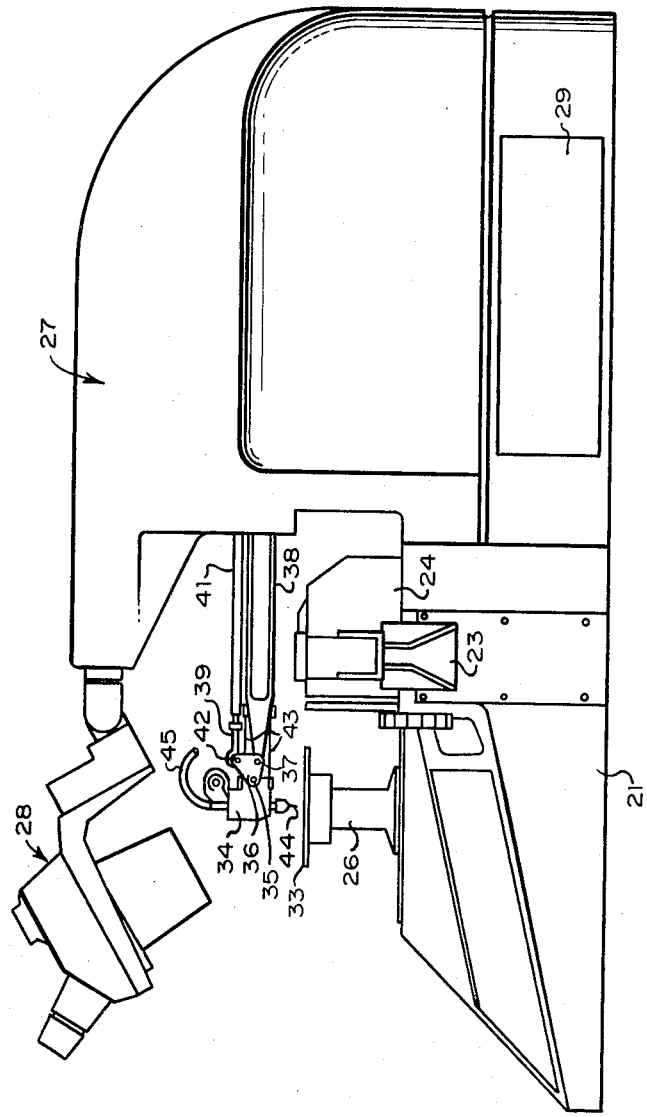

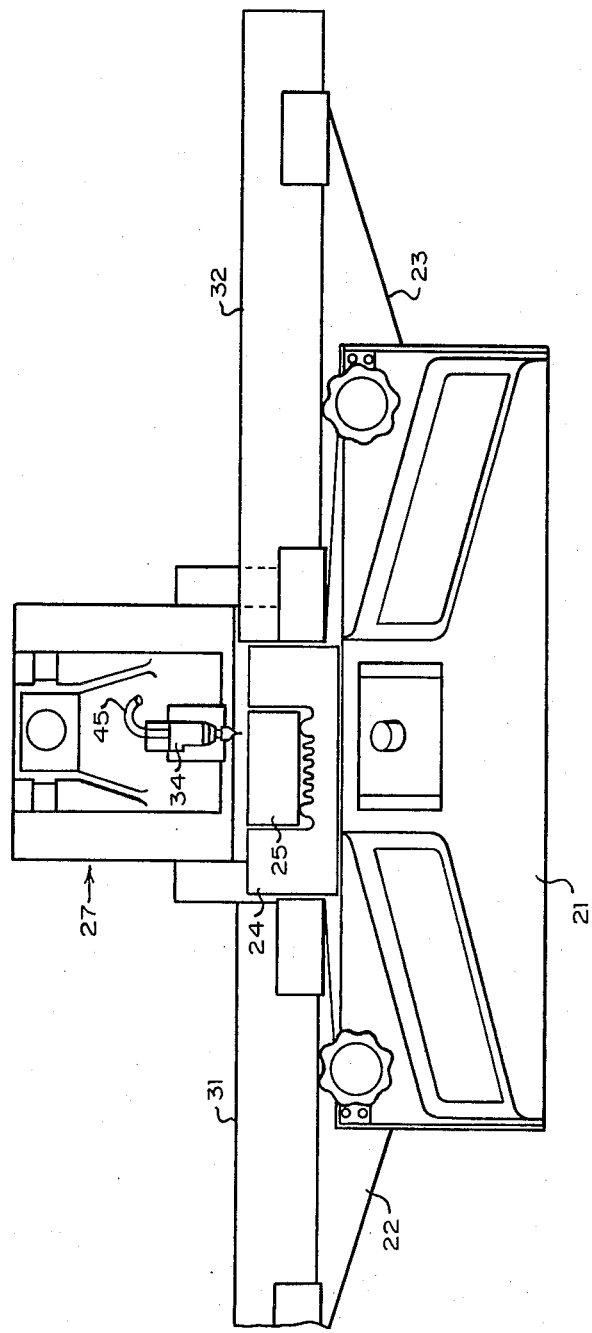

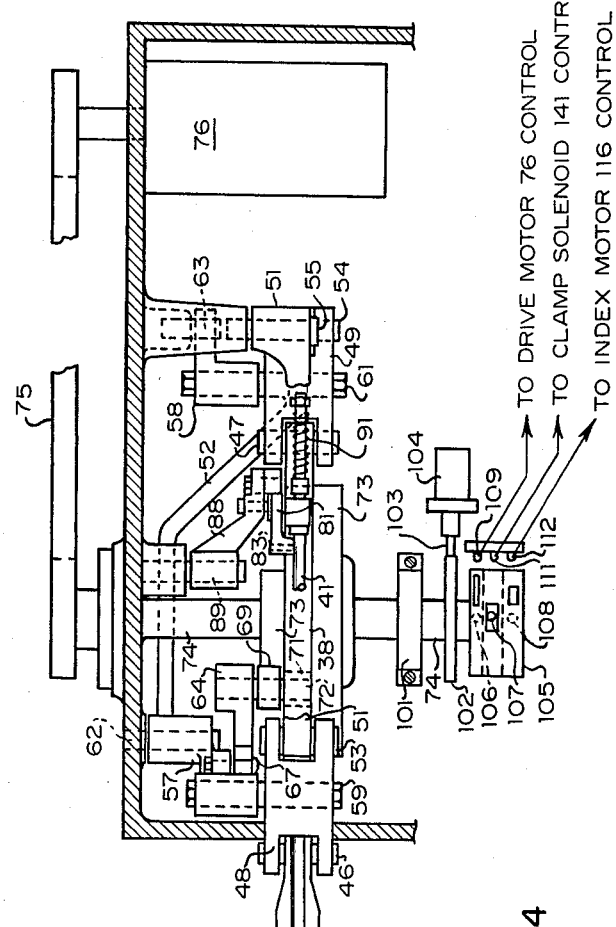
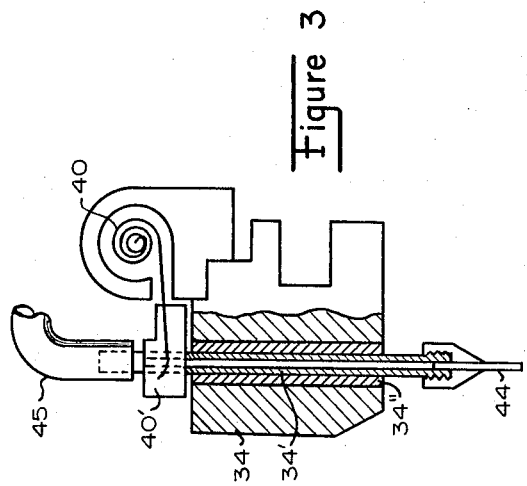
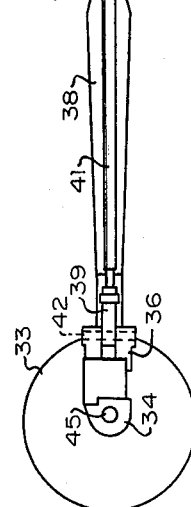

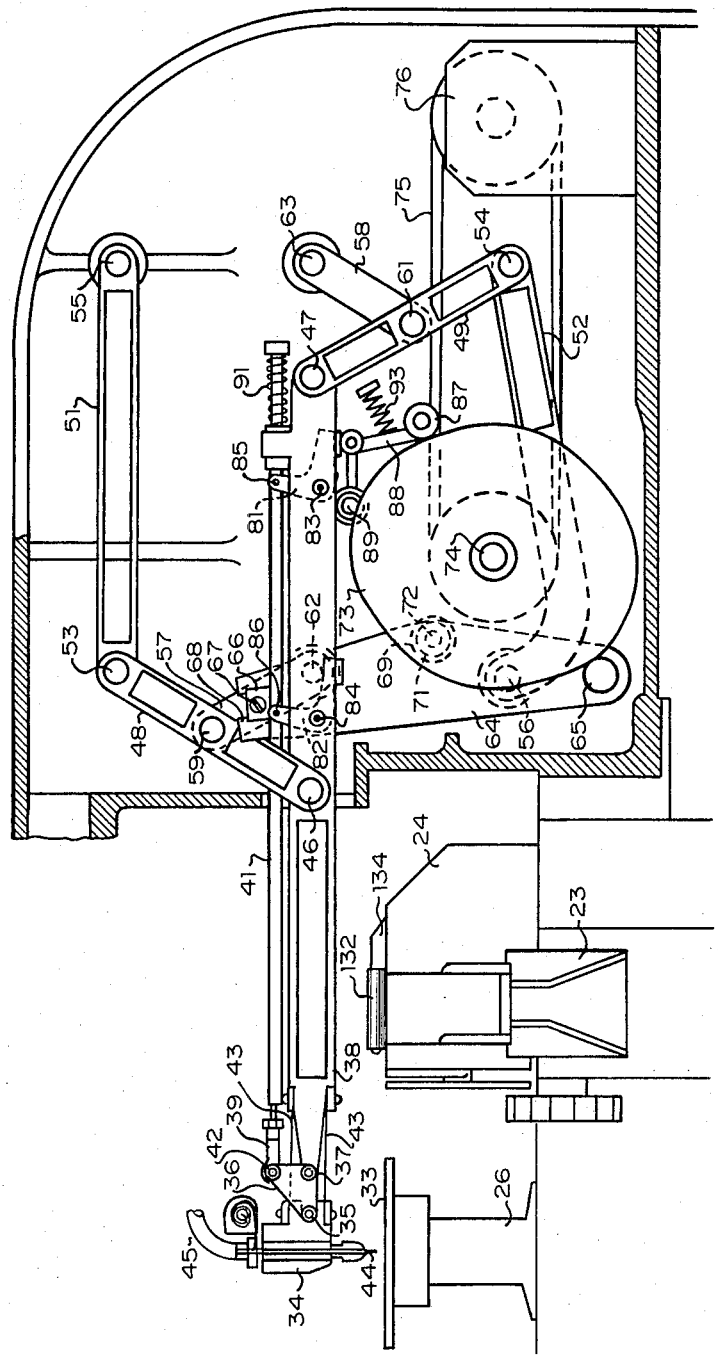

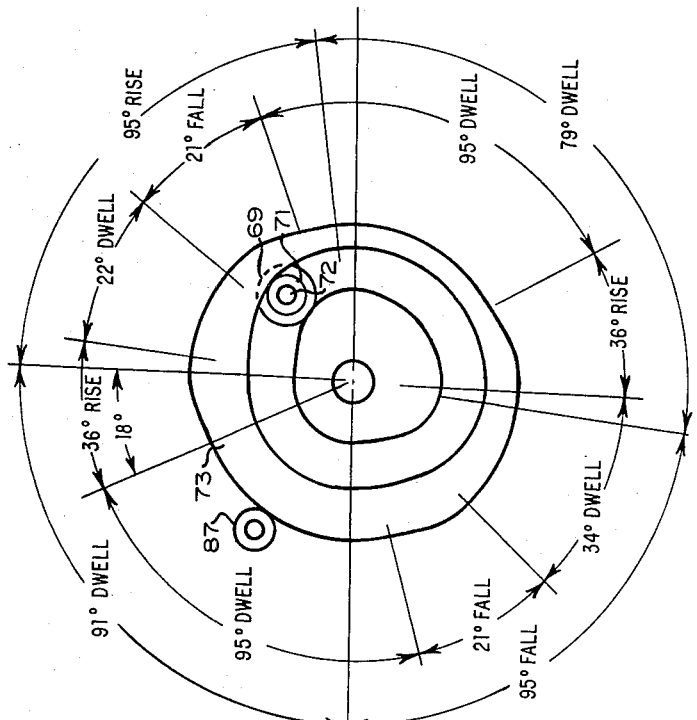
Figure 7
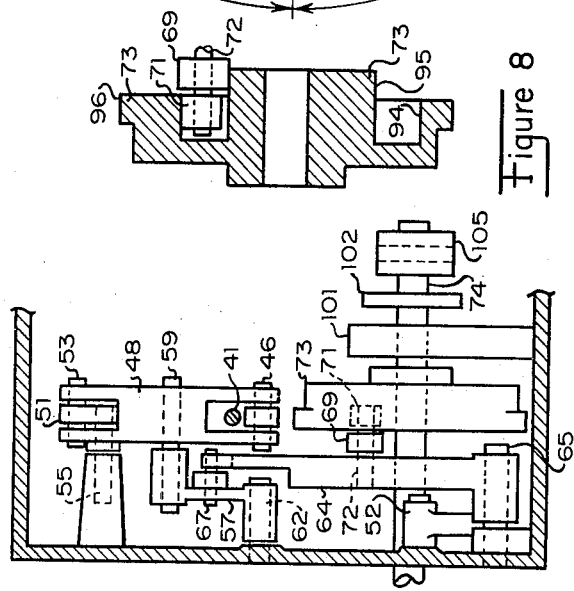
Figure 8
Figure 6
INVENTOR.
WILLIAM RADOBENKO
BY
ATTORNEY

INVENTOR
WILLIAM RADOBENKO
BY
ATTORNEY

DIE BONDER APPARATUS

BACKGROUND OF THE INVENTION

Semi-automatic die bonders are presently in use for bonding transistor circuit dice onto transistor strips by the application of heat and pressure. These bonders perform the steps of picking up a single die at a loading position, moving a die to the bonding position bonding the die onto a transistor strip, and returning to the loading position to pick up the next die. Since the dice are extremely small and must be accurately positioned and aligned on a small transistor strip, die bonders must have accurately controlled movements. In addition they must transport the dice as rapidly as possible. Die bonders heretofore available are typically only capable of producing die bonds at a rate on the order of 1,800 dice per hour, sequentially bonding one hundred dice onto each transistor strip, one transistor strip after the other. Moreover, they utilize high inertia motions resulting in slow performance and high maintenance costs.

SUMMARY OF THE PRESENT INVENTION

It is the object of the present invention to provide an improved higher speed, accurate, low inertia and reliable semi-automatic die bonder that sharply reduces the maintenance problems normally encountered with existing die bonders. The die bonder of the present invention will produce on the order of 6,000 to 7,200 accurate die bonds per hour. It employs a fast, precise linear drive motion to transport the individual die from the loading position to the bonding position. The transistor strips are fed in automatic indexing fashion to the bonding position, each transistor strip in turn being indexed into position for the attachment of each individual die.

The novel die bonder of the illustrated preferred embodiment of this invention comprises a reciprocating ram mechanism operated by a motor-driven cam and provided with a spring-loaded, floating vacuum quill for picking up and holding a die while the die is transported from the loading to the bonding position. The reciprocating ram mechanism employs a ram arm having a low-inertia, dual, straight-line, modified Scott-Russel motion with a precise linear stroke of, for example, 4½ inches within ± 0.002, obtained through a suitable amplification ratio of, for example, 8:1.

The ram arm carries a spring-loaded push rod, which is coupled at its outer end to a bell crank pivotally connected to a housing for the vacuum quill. This housing is suspended from the outer end of the ram arm by a pair of support leaf springs or reeds. A motor-driven cam operates the push rod, through an oscillating cam follower and two trip dogs coupled to the push rod and pivotally mounted on the ram arm, at the period in time when the vacuum quill is over the loading position to lower and raise the vacuum quill at the period in time when the vacuum quill is over the bonding position to pick up a die and to again lower and raise the vacuum quill to deposit the die on a transistor strip. In order to attain functional symmetry with the least functional disturbance, a modified sine-curve cam with higher harmonics eliminated is employed.

The oscillating cam follower which serves to drive the ram mechanism through an oscillating link, utilizes a double roller, one smaller diameter roller and one larger diameter roller on a common eccentric roller pin. The motor-driven cam has a groove with conjugate upper and offset lower tracks, which allow the smaller diameter roller to contact the upper track and the larger diameter roller to contact the offset lower track, thus providing a positive tracking for both rollers. The conjugate-track cam, double-roller follower, and the oscillating link form a rigid mechanism for amplifying and imparting linear motion to the ram mechanism. The oscillating cam follower combines with the linear motion ram mechanism to form a very low torque, low-inertia reciprocating mechanism.

The transistor strip indexing is accomplished by means of two sets of rollers, each set including a motor driven drive roller and a pressure or nip roller which serves to push the transistor strip against the drive rollers. The drive rollers are driven from a stepping motor pulsed from a photo-electric pulse control mounted on a drive shaft of the cam.

A fiber optics strip sensor and hole sensor mounted on the strip transistor indexing mechanism are utilized to sense the presence of a transistor strip and the presence of an indexing hole in the transistor strip. When the stepping motor is pulsed to move the transistor strip one step between bondings, the applied pulse is on only long enough to move the indexing hole from alignment with the hole sensor, a light source and photocell strips then serving to continue the motor drive until the hole sensor senses the next indexing hole. Thus, the indexing system is independent of the constant drive factor, which occurs with the use of strip sprockets, cog wheels, etc. A vertically movable strip locator and clamp positioned near the bonding position allows the nip rollers to be released as it moves downward, they allowing the transistor strip to float before locating pins enter indexing holes for positive positioning. A transistor strip heater heats the transistor strip during the bonding and indexing cycle, bringing the transistor strip from ambient temperature to a bonding temperature of 435° to 500° C. within 5 seconds.

These and other features and advantages of this invention will become more apparent from a perusal of the following specification taken in connection with the attached drawings.

DESCRIPTION OF THE DRAWINGS

FIGS. 1 and 2 are side and front views, respectively, of a die bonder according to the preferred embodiment of this invention.

FIG. 3 is a view partly in cross-section of the vacuum quill assembly utilized in the die bonder of FIGS. 1 and 2.

FIGS. 4, 5, and 6 are top, side, and front views, respectively, of the reciprocating mechanism utilized in the die bonder of FIGS. 1 and 2 to transport a die from a loading pedestal to a bonding block.

FIGS. 7 and 8 are side and cross-sectional views, respectively, of the motor-driven cam utilized in the reciprocating mechanism of FIGS. 4, 5, and 6.

DESCRIPTION OF THE PREFERRED EMBODIMENT

Figure 10:
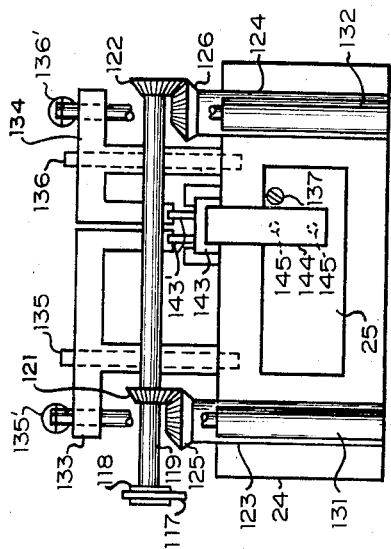
FIGS. 10 and 11 are top and front views, respectively, of the transistor strip indexing mechanism utilized in the die bonder of FIGS. 1 and 2.

Referring now to FIGS. 1 and 2, there is shown a die bonder comprising a main base 21 supporting left and right hand transistor strip magazine holders 22 and 23, respectively, transistor strip indexing mechanism 24, heater unit 25, wafer holding pedestal 26, reciprocating mechanism unit 27, microscope 28, and the electronic logic control compartment 29.

A magazine 31 containing 10 transistor strips is placed by the operator in the left hand magazine holder 22, and an empty magazine 32 is placed in the right hand holder 23. The first transistor strip is fed by the operator onto the indexing mechanism at the start of the bonding operation, and the operator observes all the dice in a wafer lying on the pedestal top plate 33 through the microscope 28. The operator controls the stopping and starting of this die bonder, and feeds each of the die on the plate 33 under the pick-up mechanism of the bonder. So long as each die is picked up in turn without miss and carried to the bonding position on the indexing mechanism, the operator will maintain the machine in its "operate" mode.

The pick-up mechanism of the bonder comprises a quill housing 34 pivotally connected by pin 35 to a bell crank 36, which is pivotally mounted at pin 37 on the outer end of a ram arm 38 and also coupled to the end 39 of push rod 41 by pivot pin 42. The quill housing 34 is movably affixed to the end of the ram arm by a pair of parallel, flexible leaf springs or reeds 43, which permit a vertical movement of the quill housing 34 on the end of the ram arm 38 under control of the lateral motion of the push rod 41. The quill housing 34 carries a hollow capillary tube 44 coupled via vacuum hose 45 to a vacuum valve operable to apply a vacuum to the capillary tube 44 to pick-up a die on the end of the tube and hold it there while the quill housing 34 is moved on the end of the ram arm 38 to the bonding position on the heater unit 25 of the indexing mechanism.

The quill assembly is shown in more detail in FIG. 3 and comprises the tubular quill 34' with the capillary tube 44 secured in the end thereof. The quill 34 slides vertically in the bushing 34", the quill being urged in a downwardly direction so as to exert pressure on the die against the transistor strip in the bonding position by means of the spiral spring 40 mounted on the housing 34. The outer end of the spring 40 engages the collar 40' affixed to the quill 34'.

As shown in FIGS. 4 and 5, ram arm 38 is mounted by pins 46 and 47 on a pair of linear motion imparting mechanisms comprising a pair of yoking links 48 and 49 pivotally coupled at one end to the ram arm by pins 46 and 47, respectively. Upper and lower compensating links 51 and 52 are pivotally coupled at one end by pins 53 and 54 to the other ends of the yoking links 48 and 49, respectively, and are pivotally affixed at their opposite ends to the main frame of the machine by pivot shafts 55 and 56, respectively. Oscillator links 57 and 58 are coupled at one end to the mid-position of the yoking links 48 and 49 by pins 59 and 61, the oscillator links being pivotally affixed to the main frame of the machine by pivot shafts 62 and 63, respectively.

This reciprocating mechanism is driven by an oscillator drive link 64 pivotally mounted at one end by pivot shaft 65 to the main frame of the machine, the other end of drive link 64 being coupled to the oscillator link 57 by means of a shoe 66, which is affixed to the oscillator link 57 by a screw 67, the shoe being slidably captured within a slot 68 in the end of the oscillator drive link 64.

As shown in FIGS. 4–8, a cam follower comprising a large diameter roller 69 and a smaller diameter roller 71 rotatably mounted on an eccentric roller pin 72 is affixed by the roller pin 72 to the oscillator drive link 64. The rollers 69 and 71 are driven by the drive cam 73 mounted on the drive shaft 74 and coupled via belt drive 75 to the main drive motor 76.

Figure 9:
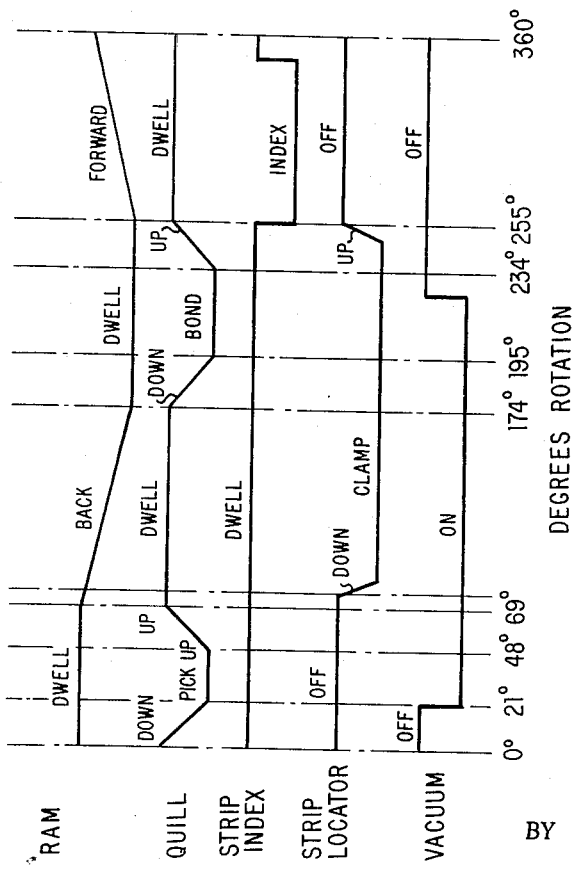
FIG. 9 is a timing diagram illustrating the sequence of operation of the die bonder of FIGS. 1 and 2.

One complete revolution of the drive cam 73 produces one forward and backward cycle of oscillator link 64, this in turn resulting in one oscillation of the oscillating link 57 to move the yoking link 48 and thus the ram arm 38 forward and then rearward over a 4½ inches linear path. As illustrated in FIG. 9, there is a forward movement of the ram arm 38 and quill housing 34, a dwell period at the wafer support plate 33, a return or backward movement of the ram arm and quill housing, and a second dwell period at the bonding position.

During the first dwell period, the quill is lowered and then raised to pick up a die from the pedestal plate, and during the second dwell period it is lowered and then raised to deposit the die at the bonding position. To accomplish this, two L-shaped trip dogs 81 and 82 are pivotally mounted by pins 83 and 84 on the ram arm 38 in spaced-apart relationship, one leg of each dog being pivotally affixed to the push rod 41 by pins 85 and 86, respectively. The other leg of dog 81 is located on the ram arm so that, with the ram in its forwardmost position and in the dwell period, the drive cam 73 will operate, through cam follower roller 87, to pivot L-shaped cam follower arm 88 in a counter-clockwise direction about the pivot shaft 89 which mounts the arm 88 on the main frame of the machine. In pivoting about shaft 89, the cam follower arm 88 rotates dog 81 counter-clockwise about pin 83 to move the push rod 41 forward on the ram arm 38 against the tension of spring 91. This causes the bell crank 36 to rotate about pin 37 and lower the quill housing 34 to engage the end of the capillary tube 44 with a die lying on the plate 33. At this time, vacuum is applied to the capillary tube and the die is thereby held against the end while the die is transported to the bonding position.

As the cam 73 continues to rotate, cam follower arm 88 rotates back in a clockwise direction under the urging of compression spring 93 to permit the push rod 41 to return to its rearmost position under the urging of compression spring 91, thus raising the quill housing 34 and the die held on the tube 44.

When ram arm 38 is in its rearmost position, the quill housing 34 is positioned over the indexing mechanism 24 and bonding heater unit 25 and the cam follower arm 88 is again operated to pivot trip dog 82 and move the push rod 41 forward to the lower quill housing 34 and the die down onto the transistor strip on the heater unit 25 to bond the die by the well known thermopressure technique to the transistor strip.

The drive cam and the three cam follower rollers are shown in detail in FIGS. 7 and 8. The smaller diameter roller 71 engages the upper side 94 of the groove in the cam while the larger diameter roller 69 rides on the lower side 95 of the groove. The cam follower roller 87 for the cam follower arm 88 rides on the peripheral surface 96 of the drive cam 73.

As shown in FIGS. 4 and 6, the cam drive shaft 74 extends through a support bearing 101 and has mounted thereon a cam 102, which operates, through cam follower 103, a vacuum valve 104 to control the application of vacuum to the capillary tube 44 at the proper time in the die pick-up cycle. A light housing 105 is also mounted on drive shaft 74 and controls the light passing from three lights 106, 107 and 108 mounted inside the housing to three photocells 109, 111 and 112 mounted outside the housing. Light 106 and photocell 109 serve to maintain this machine operable to the end of a complete cycle should the operator turn the machine off in the middle of the cycle. Light 107 and photocell 111 serve to operate the clamp solenoid described below. Light 108 and photocell 112 serve to provide the start pulse to the indexing mechanism described below.

Figure 11:
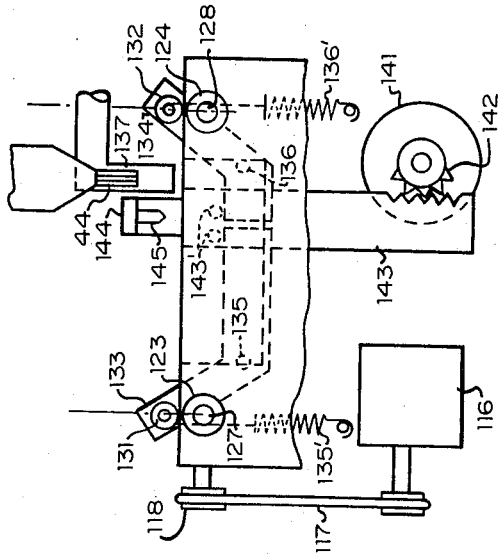

Referring now to FIGS. 10 and 11, the heater unit 25 is mounted within the indexing mechanism 24 and serves to support a transistor strip (not shown) to which the dice are bonded. The indexing mechanism includes a stepping motor 116 coupled via drive belt 117 and gear pulley 118 to shaft 119 on which are mounted two driver miter gears 121 and 122. Miter gears 121 and 122 serve to drive the two transistor strip drive rollers 123 and 124 via miter gears 125 and 126 mounted on the roller shafts 127 and 128. Nip rollers 131 and 132 are mounted on lever arms 133 and 134 pivotally mounted on shafts 135 and 136, the nip rollers being urged against the drive rollers by the action of springs 135' and 136' coupled to the two arms 133 and 134, respectively.

The transistor strip is fed by the operator between the two rollers 123 and 131, and roller 123 is driven by the stepping motor 116 until a strip of reflecting material on the transistor strip passes under the end of the fiber optic bundle 137. This fiber optic bundle contains a first inner fiber optic bundle and a second annular bundle surrounding the inner bundle. Light from the annular outer fiber optic outer bundle reflected back from the reflective strip on the transistor strip signals the presence of the transistor strip at the bonding position, and the machine is energized to start the die pick-up and transport cycle.

The inner fiber optic bundle detects the first indexing hole in the reflective strip on the transistor strip as the transistor strip moves across the heater unit 25. Presence of the indexing hole under the center optic fiber bundle signals the stepping motor 116 to stop and, thereby bring the transistor strip to rest.

A short time later, the clamping solenoid 141 is operated from the light 107 and photocell 111 to rotate the pinion 142, which, through a pinion and rack arrangement, lowers the slide 143 to lower the locating and clamping arm 144 down onto the transistor strip to hold the transistor strip clamped down on the heater unit 25 during the die bonding.

When the slide 143 first starts moving downward, integral pins 143' engage the inner ends of the two lever arms 133 and 134, which thereupon pivot about shafts 135 and 136, respectively, to raise the nip rollers 131 and 132 up off the transistor strip so the transistor strip is no longer held between the sets of rollers. As slide 143 and, hence, the locating and clamping arm 144 continue moving downward, two pins 145 in the locating and clamping arm engage two indexing holes in the transistor strip and serve to precisely align the bonding position on the transistor strip under the capillary 44 tube of the quill assembly just before the transistor strip is firmly clamped by the locating and clamping arm 144.

I claim:

1. A die bonder for picking up a die at a die pick-up position and transporting it to a bonding position, said die bonder comprising a vacuum quill for picking up the die, a ram arm carrying said vacuum quill on one end thereof, and means for moving said ram arm and vacuum quill in a straight line between the die pick-up position and the bonding position, said means including a first and a second support mechanism, each support mechanism including a yoke pivotally coupled at one end to said ram arm at a point spaced apart from the point at which the yoke of the other support mechanism is coupled to the ram arm, a compensating arm pivotally coupled at one end to the other end of the yoke and pivotally mounted at the other end at a fixed point on the die bonder, and an oscillatory link coupled mounted at one end to the yoke at a midposition thereof and pivotally mounted at the other end at a fixed point on the die bonder, said means further including an oscillatory driver link pivotally mounted at one end at a fixed pivot point on the die bonder and coupled at the other end to the yoke of one of said support mechanisms, said oscillatory driver link having a cam follower mounted thereon, a drive cam for controlling the movement of said cam follower to drive said oscillatory driver link and in turn drive said one of said support mechanisms, and cam driver means for rotating said drive cam.

2. A die bonder as in claim 1 wherein said cam follower comprises a pair of rollers rotatably mounted on a common shaft, one of said rollers engaging one side of a cam groove in said drive cam and the other of said rollers engaging the opposite side of said cam groove.

3. A die bonder as in claim 2 wherein the diameter of one of said rollers is larger than the diameter of the other of said rollers.

4. A die bonder as in claim 2 including means for moving said vacuum quill in a vertical motion on the end of said ram arm to pick up the die on the end of the vacuum quill, said last-mentioned means comprising a push rod mounted for lateral movement on said ram arm, means for coupling one end of said push rod to said vacuum quill to convert to and fro lateral movement of the push rod into up and down vertical movement of the vacuum quill, and cam follower means including a roller for engaging another surface on said drive cam and including a member coupled to said roller and to said push rod for imparting lateral motion to the push rod.

5. A die bonder as in claim 1 including means for moving said vacuum quill in a vertical motion on the end of said ram arm to pick up the die on the end of the vacuum quill.

6. A die bonder as in claim 5 wherein said last-mentioned means comprises a push rod mounted for lateral movement on said ram arm, means for coupling one end of said push rod to said vacuum quill to convert to and fro lateral movement of the push rod into up and down vertical movement of the vacuum quill, and cam follower means for engaging said drive cam, said last-mentioned cam follower means being coupled to said push rod for imparting lateral motion to the push rod.

7. A die bonder as in claim 1 including an indexing mechanism for feeding an object to the bonding position where the die may be bonded to the object, said indexing mechanism comprising object driver means for moving the object relative to the bonding position, means responsive to movement of the object to the bonding position for enabling said cam driver means, and means responsive to subsequent operation of said cam driver means in rotating said drive cam for operating said object driver means to move the object relative to the bonding position.

8. A die bonder as in claim 7 including clamping means responsive to operation of said cam driver means for holding the object at the bonding position.

9. A die bonder as in claim 8 wherein said object driver means includes a stepping motor and at least one pair of rollers for engaging the object, at least one of said last-mentioned rollers being driven by said stepping motor.

10. A die bonder as in claim 9 wherein said clamping means includes a solenoid, a clamping structure operated by the solenoid to clamp the object, and means operated by said clamping structure for disengaging said last-mentioned rollers from the object.

11. Apparatus for picking up an object at a pick-up position and transporting it to a delivery position, said apparatus comprising pick-up means for picking up the object, a ram arm carrying said pick-up means on one end thereof, and means for moving said ram arm and pick-up means in a straight line between the pick-up position and the delivery position, said last-mentioned means comprising a first and a second support mechanism, each support mechanism including a yoke pivotally coupled at one end to said ram arm at a point spaced apart from the point at which the yoke of the other support mechanism is coupled to the ram arm, a compensating arm pivotally coupled at one end to the other end of the yoke and pivotally mounted at the other end at a fixed point on said apparatus, and an oscillatory link pivotally coupled at one end to the yoke at a mid-position thereof and pivotally mounted at the other end at a fixed point on said apparatus, said means further including an oscillatory driver link pivotally mounted at one end at a fixed pivot point on said apparatus and coupled at the other end to the yoke of one of said support mechanisms, said oscillatory driver link having a cam follower mounted thereon, a drive cam for controlling the movement of said cam follower to drive said oscillatory driver link and in turn drive said one of said support mechanisms, and cam driver means for rotating said drive cam.

12. Apparatus as in claim 11 including means for moving said pick-up means in a vertical motion on the end of said ram arm to pick up the object, said lastmentioned means comprising a push rod mounted for lateral movement on said ram arm, means for coupling one end of said push rod to said pick-up means to convert to and fro lateral movement of the push rod into up and down vertical movement of the pick-up means, and means coupled to said push rod for imparting lateral motion to the push rod.

13. Apparatus as in claim 11 including an indexing mechanism for feeding a device to the delivery position where the object may be mounted on the device, said indexing mechanism comprising device driver means for moving the device relative to the delivery position, enabling means responsive to movement of the device to the delivery position for enabling said cam driver means, and means responsive to subsequent operation of said cam driver means in rotating said drive cam for operating said device driver means to move the device relative to the delivery position.

14. Apparatus as in claim 13 wherein said enabling means comprises optic means for sensing the presence of the device at the delivery position.

15. Apparatus as in claim 14 wherein said optic means includes a fiber optic bundle positioned at the delivery position for detecting light reflected from the device.

16. Apparatus as in claim 13 including a clamping mechanism operated in response to said cam driver means to hold the device at the delivery position.

17. Apparatus as in claim 16 wherein said device driver means includes a stepping motor and at least one pair of rollers driven by said stepping motor for driving the device.

18. Apparatus as claimed in claim 17 wherein said clamping mechanism includes a solenoid, a clamping structure operated by the solenoid to clamp the device, and means operated by said clamping structure for disengaging said last-mentioned rollers from the device.

19. Apparatus as in claim 11 including means for moving said pick-up means in a vertical motion on the end of said ram arm to pick up the object.

20. Apparatus as in claim 19 wherein said last-mentioned means comprises a push rod mounted for lateral movement on said ram arm, means for coupling one end of said push rod to said pick-up means to convert to and fro lateral movement of the push rod into up and down vertical movement of the pick-up means, and cam follower means for engaging said drive cam, said last-mentioned cam follower means being coupled to said push rod for imparting lateral motion to the push rod.

21. Apparatus as in claim 11 wherein said cam follower comprises a pair of rollers rotatably mounted on a common shaft, one of said rollers engaging one side of a cam groove in said drive cam and the other of said rollers engaging the opposite side of said cam groove.

22. Apparatus as in claim 21 wherein the diameter of one of the rollers of said cam follower is larger than the diameter of the other of the rollers of the cam follower.

23. Apparatus for picking up an object at a pick-up position and transporting it to a delivery position, said system comprising pick-up means for picking up the object, a transfer arm carrying said pick-up means at one end thereof, and first means for moving said transfer arm and pick-up means in a straight line between the pick-up and delivery positions, said first means comprising first and second linkage mechanisms each pivotally coupled at one end to said transfer arm and each pivotally mounted at another end at a fixed position on said apparatus, an oscillatory drive link pivotally coupled at one end to one of said first and second linkage mechanisms, a first cam follower mounted on said oscillatory drive link, a first cam for controlling the movement of said first cam follower to drive said oscillatory drive link and in turn said first and second linkage mechanisms and transfer arm, and cam drive means for rotating said first cam.

24. Apparatus as in claim 23 wherein said first cam follower comprises a pair of rollers rotatably mounted on a common shaft, one of said rollers engaging one side of a groove in said first cam and the other of said rollers engaging the opposite side of said groove.

25. Apparatus as in claim 24 wherein the diameter of one of said rollers is larger than the diameter of the other of said rollers.

26. Apparatus as in claim 23 including second means for moving said pick-up means vertically at said one end of said transfer arm to pick up the object.

27. Apparatus as in claim 26 wherein said second means comprises a push rod mounted for lateral movement on said transfer arm, means for coupling one end of said push rod to said pick-up means to convert forward and backward lateral movement of the push rod into upward and downward vertical movement of the pick-up means and a second cam follower comprising a roller engaging a surface of said first cam and further comprising means for imparting lateral movement to said push rod.

28. Apparatus as in claim 23 including an indexing mechanism for feeding a device to the delivery position whereupon the object may be mounted upon the device, said indexing mechanism comprising device drive means for moving the device relative to the delivery position, control means responsive to movement of the device to the delivery position for enabling said cam drive means and responsive to subsequent operation of the cam drive means for operating said device drive means to move the device relative to the delivery position.

29. Apparatus as in claim 28 wherein said control means includes optical means for sensing the presence of the device at the delivery position.

30. Apparatus as in claim 29 wherein said optical means includes a fiber optic bundle positioned at the delivery position for detecting light reflected from the device.

31. Apparatus as in claim 28 including clamping means responsive to movement of the device to the delivery position for holding the device at the delivery position.

32. Apparatus as in claim 31 wherein said device drive means comprises at least one pair of rollers for engaging the device and a stepping motor for driving at least one of said pair of rollers.

33. Apparatus as in claim 32 wherein said clamping means comprises a solenoid, a clamping structure operated by said solenoid to clamp the device in the delivery position, and means operated by said clamping structure to disengage at least one of said pair of rollers from the device.

34. Apparatus as in claim 23 wherein each of said first and second linkage mechanisms comprises a yoke member pivotally coupled at one end to said transfer arm, a compensating link pivotally coupled at one end to the other end of said yoke member and pivotally mounted at the other end at a fixed position on said apparatus, an oscillatory link pivotally coupled at one end to a mid-portion of said yoke member and pivotally mounted at the other end at a fixed position on said apparatus, and wherein the yoke members of said first and second linkage mechanisms are pivotally coupled to said transfer arm at spaced apart positions thereon.

* * * * *

UNITED STATES PATENT OFFICE
CERTIFICATE OF CORRECTION

Patent No. 3,695,501      Dated October 3, 1972

Inventor(s) William Radobenko

It is certified that error appears in the above-identified patent and that said Letters Patent are hereby corrected as shown below:

Column 6, line 25, after "link" insert -- pivotally --;

Column 6, line 26, delete "mounted";

Column 7, line 60, "lastmen-" should read -- last-men- --;

Column 8, line 26, delete "claimed".

Signed and sealed this 8th day of May 1973.

(SEAL)
Attest:

EDWARD M. FLETCHER, JR.
Attesting Officer

ROBERT GOTTSCHALK
Commissioner of Patents